United States Patent
Chen et al.

(10) Patent No.: US 11,714,638 B2
(45) Date of Patent: Aug. 1, 2023

(54) AVAILABILITY LEVEL-BASED SERVICE MANAGEMENT

(71) Applicant: International Business Machines Corporation, Armonk, NY (US)

(72) Inventors: Xiao Bin Chen, Beijing (CN); Tianxiang Lu, Beijing (CN); Xin Peng Liu, Beijing (CN); Xiao Jing Fu, Beijing (CN); Jian Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 16/574,508

(22) Filed: Sep. 18, 2019

(65) Prior Publication Data

US 2021/0081197 A1    Mar. 18, 2021

(51) Int. Cl.
  *G06F 9/22*    (2006.01)
  *G06F 8/60*    (2018.01)
  *G06F 9/455*   (2018.01)

(52) U.S. Cl.
  CPC ........... *G06F 9/22* (2013.01); *G06F 8/60* (2013.01); *G06F 9/455* (2013.01)

(58) Field of Classification Search
  CPC ..... G06F 8/31; G06F 8/60; G06F 9/22; G06F 9/455
  See application file for complete search history.

(56) References Cited

U.S. PATENT DOCUMENTS

| 9,906,607 | B2 | 2/2018 | Lawson |
| 10,013,275 | B2 | 7/2018 | Vyas |
| 10,289,538 | B1 * | 5/2019 | Dwivedi ............ G06F 8/36 |
| 11,087,042 | B1 * | 8/2021 | Hussey ............. G06F 8/63 |

(Continued)

FOREIGN PATENT DOCUMENTS

CN         106227611 A     12/2016

OTHER PUBLICATIONS

Anonymous, "Methodology of Providing Comprehensive Service Request Traceability in Microservice Cloud Environments," IP.com, Disclosure No. IPCOM000256213D, Nov. 13, 2018, 9 pages, priorart.ip.com/IPCOM/000256213>.

(Continued)

*Primary Examiner* — Jorge A Chu Joy-Davila
(74) *Attorney, Agent, or Firm* — Grant M. McNeilly

(57) ABSTRACT

Embodiments of the present disclosure relate to availability level-based service management. In an embodiment, a computer-implemented method is disclosed. According to the method, it is detected initiation of a request from a first microservice to a second microservice. The first and second microservices are comprised in a plurality of microservices of an application. The request comprises an expected availability level for the application. In response to a current availability level of the application being higher than or equal to the expected availability level and in response to determining that the execution of the second microservice is unavailable, the request is caused to be routed to a simulated microservice of the second microservice. The simulated microservice is configured to return to the first microservice a dummy response to the request. In other embodiments, a system and a computer program product are disclosed.

20 Claims, 8 Drawing Sheets

(56) References Cited

U.S. PATENT DOCUMENTS

| | | | |
|---|---|---|---|
| 2010/0299437 A1* | 11/2010 | Moore | H04L 67/1008 |
| | | | 709/226 |
| 2014/0136690 A1* | 5/2014 | Jain | H04L 41/0672 |
| | | | 709/224 |
| 2017/0046146 A1 | 2/2017 | Jamjoom | |
| 2017/0230349 A1* | 8/2017 | Gaur | G06F 21/629 |
| 2018/0041515 A1* | 2/2018 | Gupta | H04L 63/0815 |
| 2018/0220334 A1* | 8/2018 | Ekambaram | H04W 76/23 |
| 2018/0367363 A1 | 12/2018 | Jaeger | |
| 2019/0102280 A1* | 4/2019 | Caldato | G06F 9/5072 |
| 2020/0389517 A1* | 12/2020 | Eloy | G06F 9/505 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

910

| Service Name | Operational Status | Response Time | Condition for Unavailable Status | Configuration Information for Simulated Microservice |
|---|---|---|---|---|
| C | Active | <0.0001s | Down \|\| Res. Time >1s | Protocol: Http<br>Access Method: Post<br>Return Code: 200<br>Dummy Response: {XXX} |
| D | Active | >1s | Down \|\| Res. Time >1s | Protocol: Http<br>Access Method: Post<br>Return Code: 200<br>Dummy Response: {XXX} |
| E | Failed | -- | Down \|\| Res. Time >1s | Protocol: Http<br>Access Method: Post<br>Return Code: 200<br>Dummy Response: {XXX} |

| Availability Level | Corresponding Conditions |
|---|---|
| 1 | {<br>  C: {Status >=Failed}<br>  D: {Status >=Failed}<br>  E: {Status >=Failed}<br>} |
| 2 | {<br>  C: {Status >=Active, Res. Time <0.001s}<br>  D: {Status >=Failed, Res. Time <0.001s}<br>  E: {Status >=Failed}<br>} |
| 3 | {<br>  C: {Status >=Active, Res. Time <0.001s}<br>  D: {Status >=Active, Res. Time <0.001s}<br>  E: {Status >=Active, Res. Time <0.001s}<br>} |

| Service Name | Operational Status | Response Time | Condition for Unavailable Status | Routing Address for Simulated Microservice | Configuration Information for Simulated Microservice |
|---|---|---|---|---|---|
| C | Active | <0.0001s | Down \|\| Res. Time >1s | -- | Protocol: Http<br>Access Method: Post<br>Return Code: 200<br>Dummy Response: {XXX} |
| D | Active | >1s | Down \|\| Res. Time >1s | Routing Address for D' | Protocol: Http<br>Access Method: Post<br>Return Code: 200<br>Dummy Response: {XXX} |
| E | Failed | -- | Down \|\| Res. Time >1s | Routing Address for E' | Protocol: Http<br>Access Method: Post<br>Return Code: 200<br>Dummy Response: {XXX} |

FIG. 9C

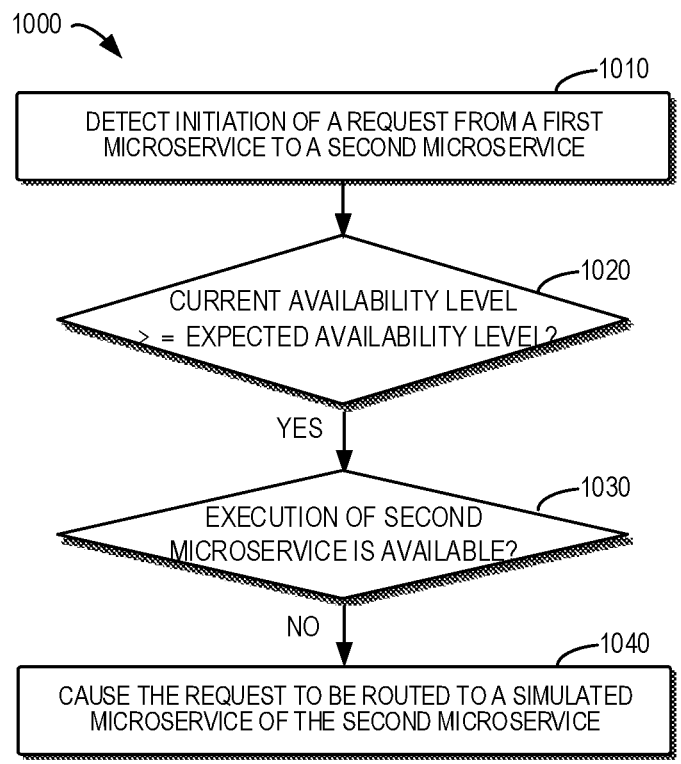

FIG. 10

AVAILABILITY LEVEL-BASED SERVICE MANAGEMENT

BACKGROUND

The present disclosure relates to computer techniques, and more specifically, to availability level-based service management.

An application or service is a program or process that typically runs on one or more hosts in a computing environment. A current trend in application development and deployment is a shift from monolithic applications/services to microservices. An application is built on top of a numbers of microservices which work together to perform respective tasks/functions of the application. During operation, one or more of the microservices may call one or more other microservices to execute as required.

SUMMARY

According to one embodiment of the present disclosure, there is provided a computer-implemented method. According to the method, it is detected initiation of a request from a first microservice to a second microservice. The first and second microservices are comprised in a plurality of microservices of an application. The request comprises an expected availability level for the application. In response to a current availability level of the application being higher than or equal to the expected availability level and in response to determining that the execution of the second microservice is unavailable, the request is caused to be routed to a simulated microservice of the second microservice. The simulated microservice is configured to return to the first microservice a dummy response to the request.

According to a further embodiment of the present disclosure, there is provided a system. The system comprises a processing unit; and a memory coupled to the processing unit and storing instructions thereon. The instructions, when executed by the processing unit, perform acts of the method according to the embodiment of the present disclosure.

According to a yet further embodiment of the present disclosure, there is provided a computer program product being tangibly stored on a non-transient machine-readable medium and comprising machine-executable instructions. The instructions, when executed on a device, cause the device to perform acts of the method according to the embodiment of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 9A schematically depict an example of configuration information for microservices before simulated microservices are deployed according to an embodiment of the present disclosure.

FIG. 9B schematically depict an example of a mapping table between availability levels of microservices and associated conditions according to an embodiment of the present disclosure.

FIG. 9C schematically depict an example of configuration information for microservices after simulated microservices are deployed according to an embodiment of the present disclosure.

FIG. 10 depicts a flowchart of an example method according to an embodiment of the present disclosure.

DETAILED DESCRIPTION

Figure 1:
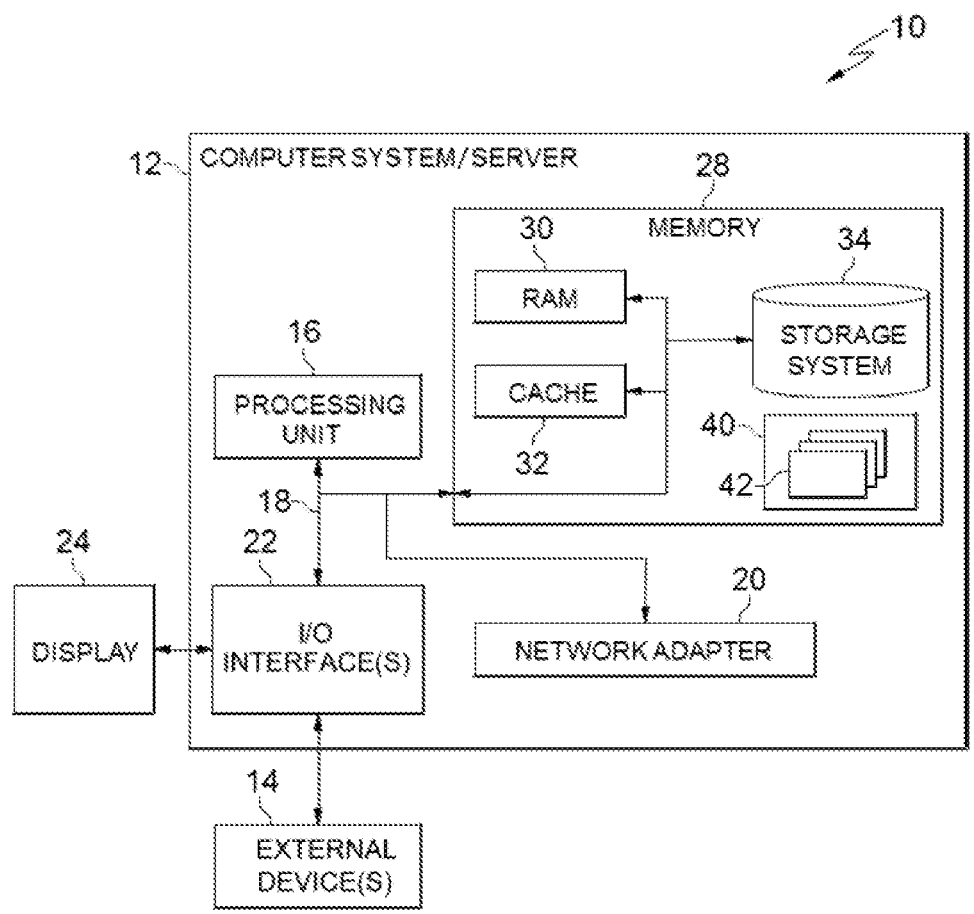
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the present disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
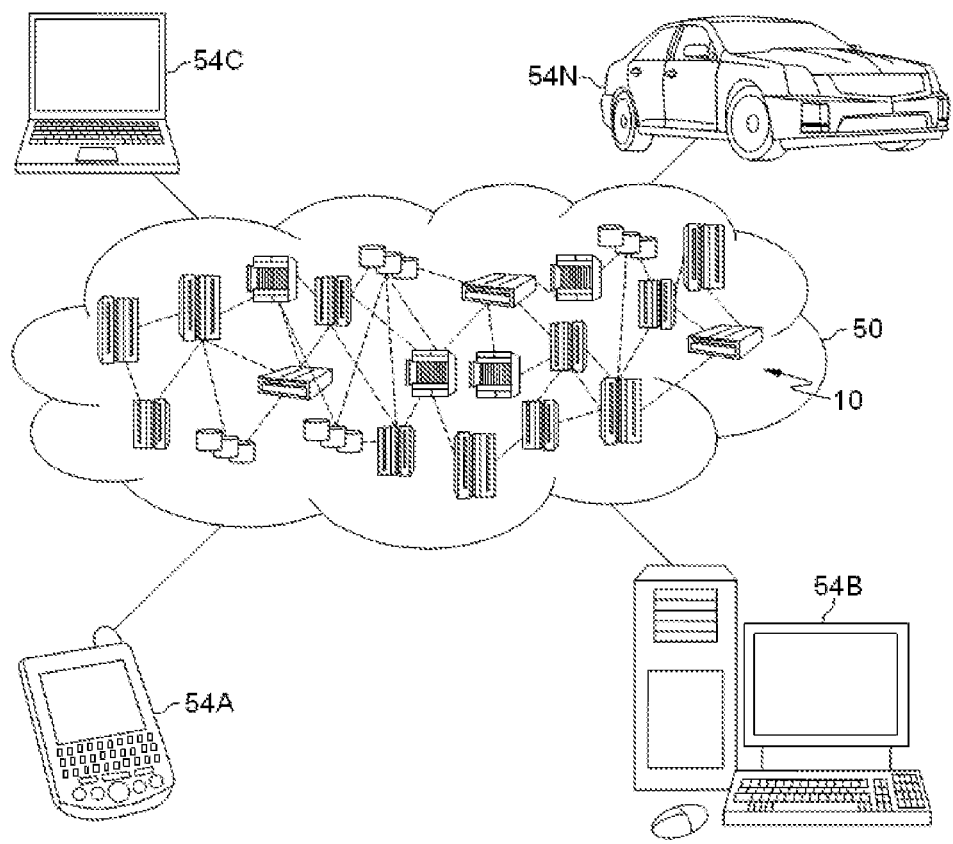
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
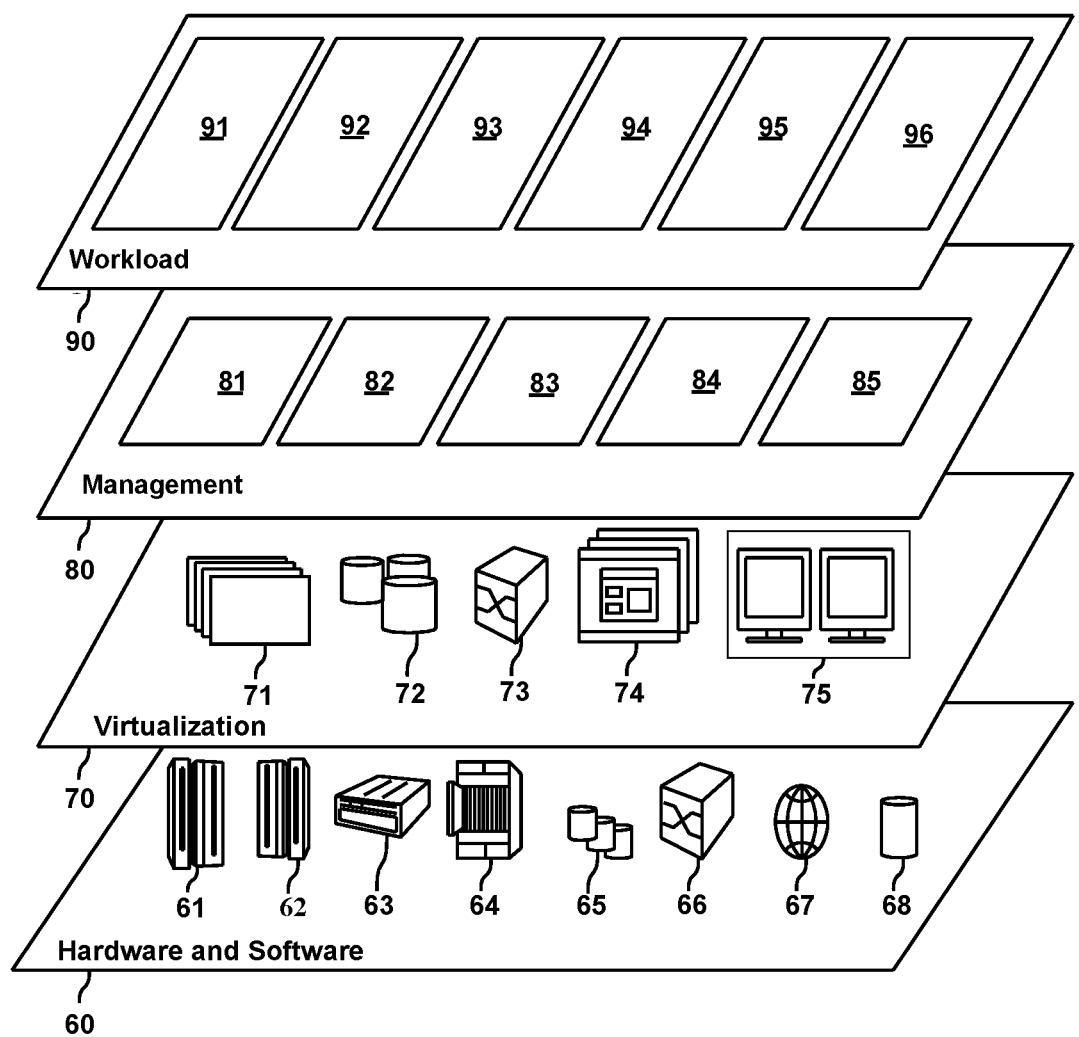
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service management 96. The functionalities of service management 96 will be described in the following embodiments of the present disclosure.

As used herein, an "application" can be a general term that can refer to any application or service capable of being executed in or otherwise provisioned by a computing environment to support corresponding tasks or functions. For example, an application can be any type of software application, web service, identity management service, firewall or other security service, messaging service, data storage or backup service, file maintenance service, status monitoring, or any other service that can be made available to consumers of the computing environment. It should be appreciated that other services associated with or otherwise supported by a computing environment are envisioned.

As mentioned above, a microservice based architecture is increasingly popular where an application is service management into a collection of smaller services, which may also be referred to as microservices or service components, to perform fine-granularity tasks or functions of the application. A "microservice" may also be referred to as a service in general. Those microservices may communicate with each other to support execution of the whole function of the application, each is responsible for a different aspect of the function or a different type of tasks to be executed of the function. Simply stated, microservices may be applications/components communicating with one another so as to provide a large-scale service.

Figure 4:
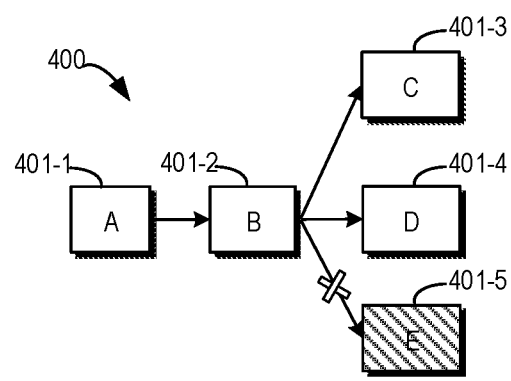
FIG. 4 schematically depicts an example showing microservices of an application according to an embodiment of the present disclosure.

FIG. 4 schematically depicts an example showing microservices of an application 400. As shown, the application 400 is implemented by a plurality of microservices, including a microservice 401-1 (represented as "A"), a microservice 401-2 (represented as "B"), a microservice 401-3 (represented as "C"), a microservice 401-4 (represented as "D"), a microservice 401-5 (represented as "E"), and so on. The microservices, such as microservices A 401-1 to D 401-5, can be collectively or individually referred to as microservices 401. The microservices 401 may communicate with each other and call or request execution of the other microservices.

In the example of FIG. 4, the microservice A 401-1 requests the microservice B 401-2 to execute a corresponding task. During execution of the microservice B 401-2, this microservice B 401-2 may further call the microservices 401-3 C to 401-5 E to execute corresponding tasks. As a specific example, in an application, the microservice B 401-2 is an enrich microservice of an application program monitor (APM) service, to enrich a request from the microservice A 401-1 into a plurality of requests to the microservices C 401-3 to E 401-5 each configured to monitor different aspects of an application program. For example, the microservice C 401-3 is configured to monitor and return status information of an operational system, the microservice D 401-4 is configured to monitor and return status information of service status of the application program, and the microservice E 401-5 is configured to monitor and return status information of a middleware.

During operation of the application 400, one or more of the microservices 401 may be failed due to various factors including the network interruption, storage failure, and/or the like. The failed microservices 401 are not available for execution. It is expected to deal with the application running before the microservices 401 are recovered from the failure.

It would be appreciated that the example of FIG. 4 is merely provided for purpose of illustration. The number of microservices and their relationship in FIG. 4 is merely shown a specific example and a different number of microservices and their relationship may be configured in other examples to provide a function of an application.

Conventionally, the respective microservices of the application 400 may be marked as in an active status or in a failed status. The unavailability of some microservices in the failed status will break off the whole transactions which require execution of those microservices. The application will become out of service even if the one or more unavailable microservices are not important and can be skipped for some service request/calls. Consequently, a minor or less important microservice may become the bottleneck of the whole application.

Generally, the requests and calling among the microservices are written in hard code by application developers. If it is expected to skip a request to a target microservice in some conditions, in some possible solution, the hard code of the requestor microservice can be changed so as to define some catch exception or call request skipping. However, this would increase complexity of application development significantly. In addition, the configuration/re-configuration of the hard code is not a flexible solution and cannot be used to deal with the service unavailability on demand.

In accordance with embodiments of the present disclosure, there is provided a solution for availability level-based service management. In this solution, a route path of a request from a first microservice of an application to a second microservice of the application is determined at least based on a current availability level of the application, an expected availability level of the application carried together with the request, and an available status of the second microservice. Specifically, upon detecting initiation of the request, if the current availability level of the application is determined to be higher than or equal to the expected availability level but execution of the second microservice is unavailable, the request is caused to be routed to a simulated microservice that is deployed for the second microservice.

Through this solution, the operation of the application is more robust, efficient, and stable. The unavailability of one or more microservices of the application will not become a bottleneck for the application. In addition, it is more flexible to dynamically control routing of service requests on demand by configuring/modifying the expected availability level in the requests and the definition of the availability of the application.

Some example embodiments of the present disclosure will be described in detail with reference to the accompanying figures.

Figure 5:
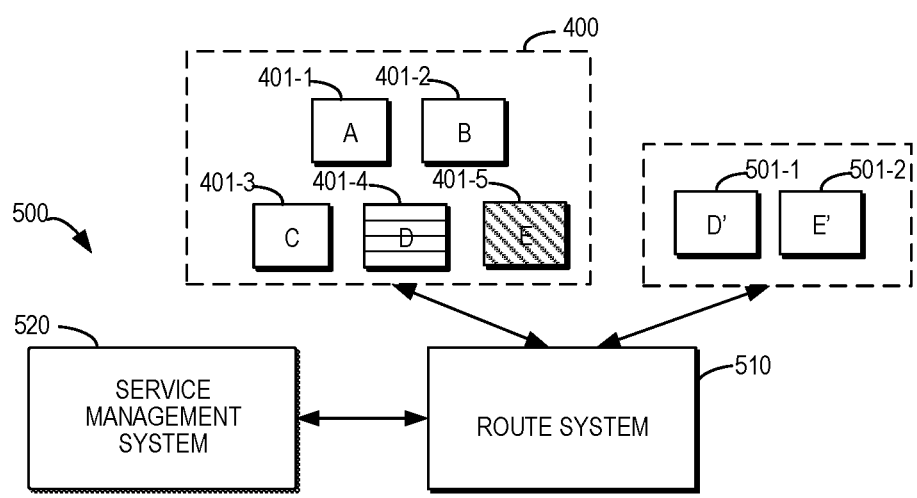
FIG. 5 depicts a block diagram of an example architecture according to an embodiment of the present disclosure.

Reference is first made to FIG. 5, which depicts a block diagram of an example architecture 500 according to an embodiment of the present disclosure. In this architecture 500, the microservices 401 of the application 400 in FIG. 4 are used as an example although it would be appreciated that any other application in a microservice based architecture can also applicable in the embodiment of the present disclosure.

The microservices 401 may be deployed in a computing environment, such as the cloud computing environment 50 of FIG. 2. In some cases, different microservices 401 may be deployed and executed in different virtual machines or physical devices in the computing environment. The communications between the microservices 401 may be supported by a route system 510 as shown in FIG. 5.

The route system 510 is configured to route a request from one microservice 401 to another microservice 401. Hereinafter, a microservice initiating a request may sometimes be referred to as a requestor microservice, while a microservice to which the request is initiated may sometimes be referred to as a target microservice 401. The route system 510 is further configured to route a result for the request from the target microservice 401 back to the requestor microservice 401. The route system 510 may be configured with information required for routing of the request, the result, and/or other information among the microservices.

According to embodiments of the present disclosure, there is provided a service management system 520 to control routing of requests among the microservices 401 at least based on a current availability level of the application 400, an expected availability level of the application 400 carried in a request from a requestor microservice 401, and an available status of a target microservice 401. To control the request, one or more simulated microservices are deployed for one or more of the microservices 401, respectively. In the shown example, a simulated microservice 501-1 (represented as D') is deployed for the microservice D 401-4 and a simulated microservice 501-2 (represented as E') is deployed for the microservice E 401-5. The simulated microservices D' 501-1 and E' 501-2 may be collectively or individually referred to as simulated microservices 501.

The simulated microservices 501 may also be deployed in a computing environment, such as the cloud computing environment 50 of FIG. 2. The simulated microservices 501 mocks up the corresponding microservice 401 of the application 400. When receiving a request, a simulated microservice 501 is configured to simply return a dummy result to the request. In other words, a simulated microservice 501 is not configured to perform the exact function/task of the corresponding microservice 401 but is utilized to let the request pass through.

One or more of the microservices 401 may have its simulated microservice deployed according to certain conditions. The simulated microservices D' 501-1, E' 501-2 are provided as specific examples for description of example embodiments herein. The deployment of the simulated microservices will be described in detail below.

The service management system 520 is configured to determine whether respective requests for the microservice D 401-4 and microservice E 401-5 are routed to these microservices themselves or to the simulated microservices or are handled in another way. The service management system 520 may coordinate with the routing system 510 to implement the routing of the requests among the microservices.

The service management system 520 and/or the route system 510 may be implemented as corresponding applications, functions, modules, virtual/physical devices in the architecture 201. The scope of the embodiments of the present disclosure is not limited in this regard.

Figure 6:
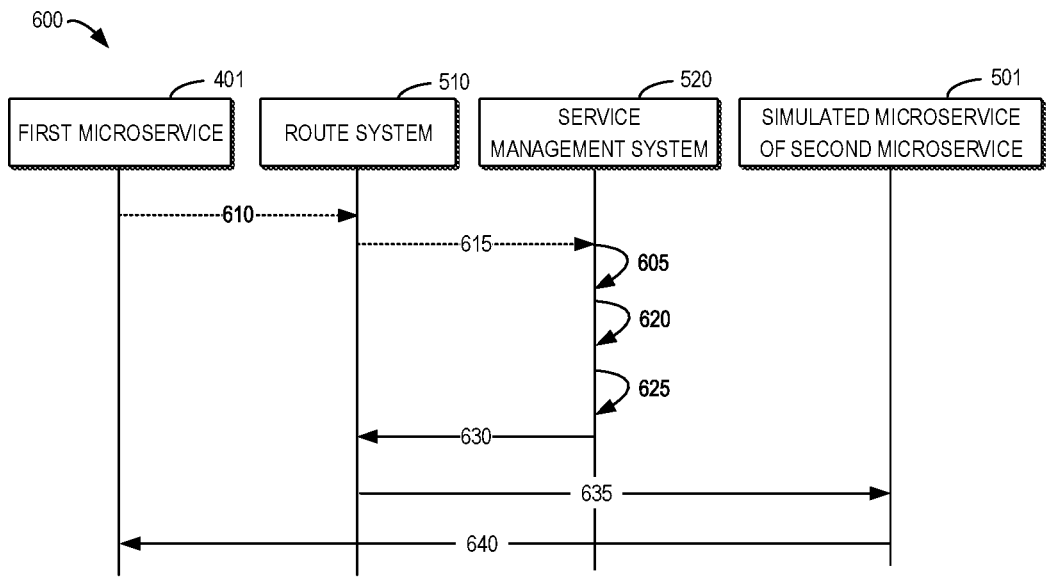
FIG. 6 depicts a signaling chart of interactions between the service management system with relevant entities in the architecture of FIG. 5 according to an embodiment of the present disclosure.

The service management performed by the system 520 will be discussed in detailed with reference to FIG. 6. FIG. 6 depicts a signaling chart 600 of interactions between the service management system 520 with relevant entities in the architecture 500 according to an embodiment of the present disclosure. As illustrated, in addition to the service management system 520, the signaling chart 600 involves a first microservice 401 of the plurality of microservices 401, the first route system 510, and a simulated microservice 501 of a second microservice 401 among the plurality of microservices 401.

During operation of an application, such as the application 400, the service management system 520 detects 605 initiation of a request from a microservice 401 of the application to another microservice 401 of the application. For convenience of discussion, the microservice 401 initiating the request or the requestor microservice 401 is referred to as a "first microservice" 401, and the microservice 401 to which the request is initiated, i.e. the target microservice, is referred to as a "second microservice" 401. The second microservice 401 is not shown in the signaling chart of FIG. 6. The embodiments of the present disclosure involve routing of a request targeted to the second microservice 401 to its simulated microservice. In the specific example shown in FIG. 5, the second microservice 401 with the simulated microservice 501 deployed includes the microservices D/D' 401-4/501-1 and E/E' 401-5/501-2, and the first microservice 401 initiating the request is the microservice B 401-2. For better understanding, some of the embodiments described below will be illustrated with reference to the specific example shown in FIG. 5.

In some embodiments, the initiation of the request may be determined by directly monitoring requests sent from the first microservice 401 by the service management system 520. In some alternative embodiments, the initiation of the request may be notified by the route system 510 to the service management system 520. These embodiments are shown in FIG. 6. Specifically, the first microservice 401 of the application sends 610 the request initiated for the second microservice 401 to the route system 510, expecting that the route system 510 will route this request to its target. Upon receiving the request from the first microservice 401, the route system 510 indicates 615 to the service management system 520 that the first microservice 401 initiates a request to the second microservice 401. The service management system 520 may detect the initiation of the request by other functional systems/modules in other embodiments.

In some embodiments, the service management system 520 may detect and manage routing of requests from each of the microservices 401 of the application 400. In some other embodiments, the service management system 520 may only care about requests initiated to one or more microservices 401 of the application 400 which are preconfigured to be managed by the service management system 520, especially those that are possible to be simulated, as will be discussed below. For the microservices that are not managed by the service management system 520, such as the microservice A 401-1 and the microservice B 401-2 of the application 400, the route system 510 may handle the routing of their requests according to legacy routing rules.

The request from the first microservice 401 includes an expected availability level for the application 400. The expected availability level indicates an acceptable or required availability level of the application 400 when processing the request. The expected availability level may be fixed or changed during operation of the application. The specific expected availability level indicated in each request of a microservice 401 may be a default availability level for the application 400, or a customized availability level required by a customer of the application 400.

Upon detecting the initiation of the request from the first microservice 401 to the second microservice 401, the service management system 401 compares 620 a current availability level of the application 400 with the expected availability level included in the initiated request.

According to embodiments of the present disclosure, an application may be at one of a plurality of predetermined availability levels. A current availability level of an application may indicate a real-time overall status of the application that is related to operation of the microservices, the deployment environment of the microservices, and/or any other metrics related to the status of the application operation. The expected availability level in a request may be corresponding to one of the plurality of predetermined availability levels. By carrying the expected availability level, the requests of the microservices 401 can be processed in different manners depending on a comparison of the current availability level of the application 400 and the expected availability level. The plurality of possible availability levels may be represented in any suitable manners, such as Availability Level 1, Availability Level 2, Availability Level 3, and so on. It is noted that depending on the definitions, the larger number may indicate a relatively higher availability level or a lower availability level. The determination of a current availability level of the application will be discussed in detail below.

If the current availability level is higher than or equal to the expected availability level, which means that current availability of the application 400 satisfies expected availability for processing the initiated request, the service management system 401 determines 625 whether execution of the second microservice 401 is available. Available execution of the second microservice 401 indicates that the second microservice 401 is in a good condition for execution.

Whether execution of the second microservice 401 is available may depend on various factors related to execution of the second microservice 401.

In some embodiments, the service management system 520 may determine whether execution of the second microservice 401 is available based on an operational status and/or a response time of the second microservice 401. The operational status of a microservice may include an active or online status where the microservice is accessible to be requested for execution, and a failed or offline status where the microservice is failed to be requested for execution. A response time of a microservice indicates how long it takes for the microservice to complete an incoming request. The service management system 520 may collect the response times of the microservice 401 in processing several requests and then compute an average response time for the microservice 401.

In an embodiment, if the operational status indicates that the second microservice 401 is failed, the service management system 520 determines that the execution of the second microservice 401 is unavailable. In an embodiment, if the (average) response time of the second microservice 401 exceeds a threshold time length, the service management system 520 determines that the execution of the second microservice 401 is unavailable. Otherwise, if the operational status indicates that the second microservice 401 is active for execution or if the (average) response time is within the threshold time length, the service management system 520 determines that the execution of the second microservice 401 is available. The threshold time length may be set as any suitable value, which may be specific for a microservice or for an application.

As some examples, it is assumed that the microservice B 401-2, as a first microservice 401, initiates respective requests to the microservices C 401-3 to E 401-5 and the current availability level of the application 400 is higher than or equal to the expected availability level in the requests. If the microservice D 401-3 responds slowly to a request (with the response time exceeding the predetermined threshold) due to source insufficiency or other factors, the service management system 520 may determine that execution of the microservice D 401-4 is unavailable because it may incur a large delay for the request. As another example, if the microservice E 401-5 is failed, the service management system 520 may determine that execution of the second microservice E 401-5 is unavailable because this microservice is inaccessible.

In the example embodiments described above, the comparison of the current and expected availability levels is performed before the determination of the unavailable execution of the second microservice. In some other embodiments, the comparison of the current and expected availability levels and the determination of the unavailable execution of the second microservice may be performed in an inverse order or may be performed in parallel.

If it is determined that the execution of the second microservice 401 is unavailable and the current availability level of the application 400 is higher than or equal to the expected availability level, the service management system 520 causes the request to be routed to a simulated microservice 501 for the second microservice 401 of the application. The service management system 520 may first determine whether a simulated microservice 501 for the second microservice 401 has been deployed. In the case that the simulated microservice 501 has been deployed, the service management system 520 causes the request to be routed to the simulated microservice 501.

In an example, the service management system 520 indicates 630 to the route system 510 to route the request of the first microservice 401 to the simulated microservice 501. The service management system 520 may maintain a routing address of the simulated microservice 501 and may indicate such routing address to the route system 510. As an alternative, the route system 510 may maintain the routing address of one or more simulated microservices 501 and the service management system 520 may provide an identification of the simulated microservice 501 of the second microservice 401 to the route system 510. The route system 510 then routes 635 the request from the first microservice 401 to the simulated microservice 501, instead of to the second microservice 401 which is unavailable for execution currently.

The simulated microservice 501 may not be configured to actually execute the request to generate an actual response. Instead, the simulated microservice 501, upon receiving the routed request, returns 640 to the first microservice 401 a dummy response to the request. The dummy response may include predefined information, indicating to the first microservice 401 that this response is from a simulated microservice. The dummy response may be configured with any predetermined information as long as it can be interpreted by the first microservice 401 as being provided from a simulated microservice. The dummy response from different simulated microservices 501 of the application 400 may be the same or different.

Still using the example shown in FIG. 5, if it is determined that the current availability level of the application 400 is higher than or equal to the expected availability level included in the requests to the microservices D 401-4 and E 401-5 and execution of these two microservices are both unavailable, the service management system 520 may cause the requests initiated by the microservice B to be routed to the simulated microservices D' 501-1 and E' 501-2, respectively. The simulated microservices D' 501-1 and E' 501-2 then return dummy response to the requestor microservice B 401-2.

In conventional solutions, if one or more microservices of an application are failed, requests from other requestor microservices to the failed microservices may be pending as no responses from the failed microservices. The requestor microservices may wait for a certain period to determine that the requests cannot be processed. Some requestor microservices cannot obtain any meaningful/useful results if one or some of the target microservices are failed. As compared with the conventional solutions, according to the embodiments of the present disclosure described above, in the cases where execution of one or more microservices 401 are unavailable, the requests can be skipped from the unavailable microservices 401 and passed through their simulated microservices 501. As such, a requestor microservice can receive the response as quick as possible without waiting for the period configured for request pending. As such, the overall latency of the application operation can be reduced. In addition, it is possible for the requestor microservice 401 to obtain meaningful responses from one or more other target microservices 401.

In some embodiments, in comparison of the current availability level of the application 400 to the expected availability level, if the current availability level is lower than the expected availability level (meaning that availability of the application fails to satisfy the required availability), the service management system 520 may indicate to the route system 510 or to the first microservice 401 a failure of the request. In some embodiments, in determination whether execution of the second microservice 401 is available, if it is determined that the second microservice 401 is available for execution, the service management system 520 may cause the request to be routed to the second microservice 401 for execution.

The determination of the current availability level of the application is now discussed here. As mentioned above, an availability level of an application can be determined dynamically when a request is initiated for a microservice. In some embodiments, an availability level of the application 400 may depend on respective operational status of one or more of the microservices 401. Instead of making the whole application unavailable when one or more microservices are failed, in some embodiments, one or more failed microservices 401 may cause a degradation of the current availability level of the application 400. In an embodiment, the availability level of the application 400 may be related to the microservices 401 that are managed by the service management system 520, such as the microservices C 401-3, D 401-4, and E 401-5.

As an alternative, or in addition, the availability level of the application 400 may also depend on respective response times of one or more of the microservices 401. As mentioned above, the service management system 520 may collect the response times of the microservice 401 in processing several requests and compute an average response time for the microservice 401. If the (average) response times of one or more of the microservices 401 are prolonged (for example, longer than corresponding threshold time lengths), the availability level of the application 400 is degraded.

In some embodiments, the availability level of the application 400 may alternatively or additionally depend on status information of an environment where at least one of the microservices 401 are deployed, such as the cloud computing environment 50. The status information may indicate availability of storage resources, processing resources, networking resources, and/or other resources that are used to supported execution of the microservices 401. In an example, if there are sufficient available resources for execution of the one or more microservices 401, the availability level of the application 400 may be in a high level; otherwise, the availability of the application may be degraded.

In some embodiments, the availability level of the application 400 may be determined alternatively or additionally based on a Quality of Service (QoS), a Service Level Agreement (SLA), a Service Level Objective (SLO) of the application 400, and/or any other quality metric related to the status of the application 400. It would be appreciated that some example factors that may be related to availability of the application 400 are described above and other related factors are also possible in other embodiments.

The embodiments of functionalities of the service management system 520 have been discussed above. As mentioned, the service management system 520 may be responsible for deployment of one or more simulated microservices 501, determination of a real-time availability level of the application 400, and routing control of requests from the services. Those functionalities may be implemented in individual modules in the service management system 520.

Figure 7:
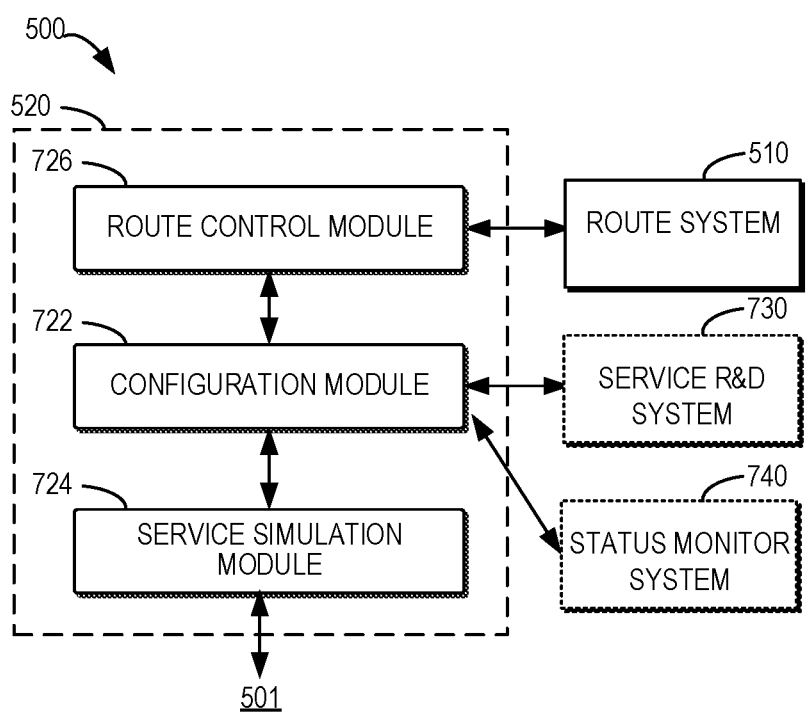
FIG. 7 depicts a block diagram of the example architecture of FIG. 5 showing modules in the service management system according to an embodiment of the present disclosure.

FIG. 7 depicts the architecture 500 where specific modules of the service management system 520 are shown. The interactions of those modules therebetween and with systems outside the service management system 520 are described below. For clarity of illustration, the microservices and the simulated microservices are not depicted in FIG. 7. It would be appreciated that the functionalities described for one module in the service management system 520 may also be implemented by one or more other modules, and the functionalities described for more than one module can be integrated within a single module. The scope of the present disclosure is not limited in this regard.

The deployment of the simulated microservices and/or the availability level of the application may be determined based on status of the microservices and/or the application, thus the service management system 520 includes a configuration module 722 to maintain the status and related configurations for the microservices 401. The configuration module 722 may interact with a service register & discovery (R&D) system 730 and a status monitor system 740 to determine, update, and maintain corresponding configuration information. The service R&D system 730 is configured to register and discovery one or more microservices 401 in a computing environment according to microservice definitions. The status monitor system 740 is configured to monitor status information of the microservices 401 during operation. The service R&D system 730 and the status monitor system 740 may be implemented conventionally in the computing environment for the microservice deployment.

The service management 530 further comprises a service simulation module 724 configured to deploy a simulated microservice 501 for a microservice 401 when a predetermined condition for microservice simulation is satisfied, and a route control module 726 configured to control routing of requests. The route control module 726 may communicate with the route system 510 to control the routing of certain requests. In some examples, the route control module may be implemented as a hook to work together with the route system 510, for example, through side-car with an envoy proxy filter, a kube proxy, iptables, and/or the like.

The interactions between the modules and the external systems will be described with reference to FIG. 8, which shows a signaling chart 800 of interactions between the modules of the service management system 520, the service R&D system 730, and the status monitor system 740.

In the cases where the service R&D system 730 has created, deployed, or updated one or more microservices 401 of the application 400, especially the microservices 401 managed by the service management system 520 (such as the microservices C 401-3 to E 401-5), the service R&D system 730 provides 805 status information of the microservices 401 to the configuration module 722 of the service management system 520. The configuration module 722 maintains operation-related configuration information for the microservices 401. Upon receiving the status information of the microservice 401, the configuration module 722 updates 810 the operation-related configuration information for the microservices 401. During operation, if the status monitor system 740 detects any updates to the operation-related configuration information, the configuration module 722 may update the information accordingly. The configuration module 722 may synchronize 815 the operation-related configuration information with the route control module 726 periodically or intermittently such that the route control module 726 can determine how to route the request based on such information.

FIG. 9A depicts an example of operation-related configuration information 910 maintained by the configuration module 722. As shown, the configuration information 910 is related to microservices C 401-3 to E 401-5, including operational status and response times of those microservices. The operational status and the response times may be updated according to information from the service R&D system 730 and/or the status monitor system 740.

The configuration information 910 may further include respective conditions for determining whether execution of the respective microservices 401 is unavailable. Those conditions may be default, configured by users, and/or dynamically adjusted according to historical data analysis, for example, based on machine learning technologies. In this shown example, the available/unavailable execution of a microservice is based on the operational status and the response time. However, it would be appreciated that more, less, and other factors may also be used to determine whether execution of a microservice is available or not. Although same conditions are illustrated, the different microservices 401 may be configured with different conditions for determining the unavailable status of the microservice execution.

In some examples, the configuration information 910 may further include predetermined configuration information for simulated microservices 501 of the microservices 401 if being deployed. The configuration information includes an access protocol (Hyper Text Transfer Protocol (HTTP) in this example) and a request method ("Post" in this method) of the simulated microservices. The configuration information further includes a dummy response and a predefined code which are returned to the requestor microservices 401 when the request is routed to the simulated microservices 501. It would be appreciated that more, less, and different configuration information for the simulated microservice 501 may be included in the configuration information 910. Although same configuration information is illustrated, simulated microservices for the different microservices 401 may be defined with different configuration information.

In addition to the operation-related configuration information 910, the configuration module 722 may further maintain a mapping table 920 between availability level and corresponding conditions for those availability levels as shown in FIG. 9B. In the example mapping table 920, possible availability levels includes three levels, Level 1, Level 2, and Level 3, each level corresponding to different operational status and response times of the microservices 401. In this example, Level 3 is higher than Level 2, while Level 2 is higher than Level 1. According to the mapping table 920 and in conjunction of current status of the microservice 401, a current availability level of the application 400 may be determined. It would be appreciated that FIG. 9B merely provides a specific example for the definition of the availability level, other factors may be considered as conditions for one or more availability levels, and other availability level division is also be possible.

Figure 8:
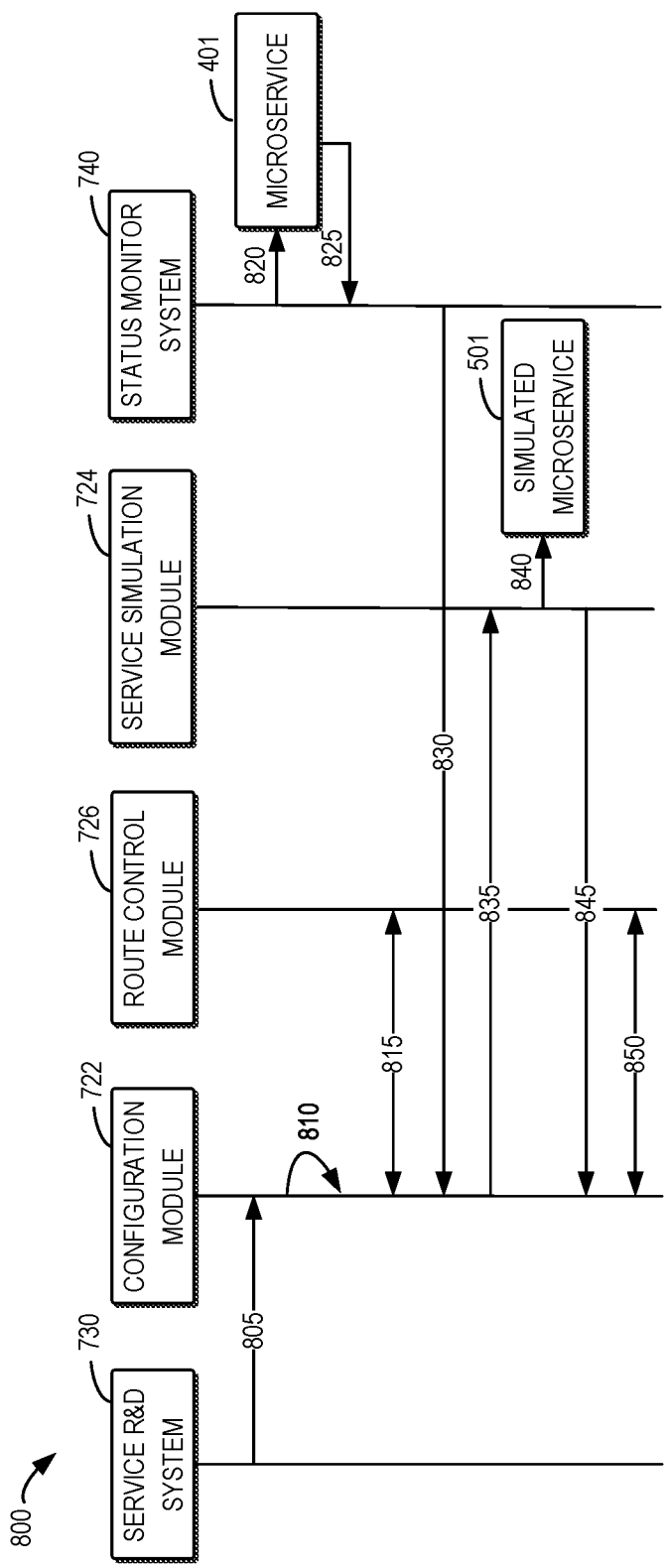
FIG. 8 depicts a signaling chart of interactions between modules in the service management system with relevant entities in the architecture of FIG. 7 according to an embodiment of the present disclosure.

Reference back to FIG. 8, the status monitor system 740 monitors 820 and obtains 825 status information of one or more microservices 401 according to one or more predetermined monitoring rules. In some embodiments, if the status monitor system 740 detects any change to the microservices 401, for example, a microservice 401 becoming failed or having a prolonged response time, the status monitor system 740 indicates 830 the configuration module 722 to update the operation-related configuration information 910.

In some embodiments, if it is determined that execution of a microservice 401 becomes unavailable, for example, due to the failed status and/or the prolonged response time, the configuration module 722 may determine whether the microservice 401 satisfies a predetermined condition for microservice simulation. The predetermined condition may be related to the importance of the specific microservice 401, a user indication of allowance of microservice simulation of the microservice, request initiation to the specific microservice 401, and/or any other suitable factors.

Generally, simulated microservices are not suitable or meaningful for all microservices of the application. If a microservice 401 receives a request from a customer, may be called by a large number of microservices 401, will be executed to request a number of dependent microservices 401 to execute, and so on, which means that this microservice 401 is important to the application 400 and skipping the requests for this microservice 401 is inappropriate, then it is suggested not deploying a simulated microservice for this microservice. The importance of the microservices 401 in the application may be determined based on historical data analysis, for example, based on machine learning technologies, and/or based on user settings/configurations.

In some embodiments, if the importance of an unavailable microservice 401, such as the microservices 401-4 and 401-5, is lower than a predetermined importance threshold, then the configuration module 722 may determine to simulate those microservices 401. The importance threshold may be set as any suitable value according to actual requirements of the operation of the application. In some other embodiments, if a user indication of allowance of microservice simulation for a certain microservice 401 is received, then the configuration module 722 may determine to simulate those microservices.

In some embodiments, the simulation of the microservice 401 may be triggered upon detecting initiation of a request from another microservice 401 (such as a request from the microservice B 401-2 to the microservice D 401-4 or E 401-5). That is to say, a corresponding simulated microservice 501 is deployed upon detecting that a request has been initiated to an unavailable microservice 401. In this way, there is no need to unnecessarily consume resources by the deployment of the simulated microservice 501 if the corresponding microservice 401 of the application 400 is not to be called or requested.

If the configuration module 722 determines that a specific microservice 401 satisfies the predetermined condition, it causes 835 the service simulation module 724 to deploy a simulated microservice 501 for the specific microservice 401. For example, upon detecting initiation of requests from the microservice C 401-3 to two unavailable microservices D 401-4 and E 401-5, and upon determining that the importance of the two microservices is lower than the corresponding threshold, the service simulation module 724 deploys, the simulated microservice D' 501-1 for the microservice D 401-4 and the simulated microservice E' 501-2 for the microservice E 401-5. The configuration module 722 may provide configuration information for a simulated microservice, such as the configuration information for simulated microservices that is maintained in the operation-related configuration information 910. The service simulation module 724 deploys 840 the simulated microservice 501 for the specific microservice 401 according to the corresponding configuration information.

Upon completion of the deployment, the service simulation module 724 provides 845 a routing address of the deployed simulated microservice 501 to the configuration module 722. The configuration module 722 may update the operation-related configuration information for microservices to indicate the routing address of the simulated microservice 501. As shown in FIG. 9C, the configuration information 910 of FIG. 9A is updated by adding routing addresses for simulated microservices D' 501-1 and E' 501-2 for the microservices D 401-4 and E 401-5. The configuration module 722 may further synchronize 850 the updated operation-related configuration information with the route control module 726 which may thus route requests to the simulated microservices 501 based on the corresponding routing addresses.

In the cases of detecting initiation of a request from a first microservice 401 to a second microservice 401 that is unavailable for execution, after the simulated microservice 501 is deployed and the configuration information is updated to the route control module 726, the routing control of the request as described above may be performed.

FIG. 10 shows a flowchart of an example method 1000 according to an embodiment of the present disclosure. The method 1000 can be implemented at the service management system 520 of FIG. 5. For the purpose of discussion, the method 1000 will be described from the perspective of the service management system 520 with reference to FIG. 5.

At block 1010, the service management system 520 detects initiation of a request from a first microservice to a second microservice. The first and second microservices are comprised in a plurality of microservices of an application. The request comprises an expected availability level for the application. At block 1020, the service management system 520 determines whether a current availability level of the application is higher than or equal to the expected availability level. In response to the current availability level of the application being higher than or equal to the expected availability level, at block 1030, the service management system 520 determines whether execution of the second microservice is available. In response to determining that the execution of the second microservice is unavailable, at block 1040, the service management system 520 causes the request to be routed to a simulated microservice of the second microservice, the simulated microservice configured to return to the first microservice a dummy response to the request.

In some embodiments, the method 1000 further comprises determining the current availability level of the application based on at least one of the following: a respective operational status of at least one of the plurality of microservices, a respective response time of at least one of the plurality of microservices, status information of an environment where at least one of the plurality of microservices are deployed, a Quality of Service (QoS) of the application, a Service Level Agreement (SLA) of the application, and a Service Level Objective (SLO) of the application.

In some embodiments, determining whether the execution of the second microservice is available comprises: determining whether the second microservice is failed; and in response to determining that the second microservice is failed, determining that the execution of the second microservice is unavailable.

In some embodiments, determining whether the execution of the second microservice is available comprises: determining whether a response time of the second microservice exceeds a threshold time length; and in response to determining that the response time exceeds the threshold time length, determining that the execution of the second microservice is unavailable.

In some embodiments, the method 1000 further comprises in response to detecting that the execution of the second microservice is unavailable, determining whether the second microservice satisfies a predetermined condition for microservice simulation; and in response to determining that the second microservice satisfies the predetermined condition, deploying the simulated microservice for the second microservice.

In some embodiments, determining whether the second microservice satisfies the predetermined condition comprises: determining that the second microservice satisfies the predetermined condition based on at least one of the following: a determination that the request is initiated to the second microservice, a determination that importance of the second microservice for the application is lower than a predetermined importance threshold, and a user indication of allowance of microservice simulation for the second microservice.

In some embodiments, the method 1000 further comprises maintaining configuration information related to the simulated microservice, the configuration information comprising at least one of the following: the dummy response, an access protocol, a request system, and a predefined code of the simulated microservice. In some embodiments, deploying the simulated microservice comprises deploying the simulated microservice based on the configuration information.

In some embodiments, the method 1000 further comprises in response to determining that the simulated microservice is deployed for the second microservice, maintaining a routing address of the simulated microservice. In some embodiments, causing the request to be routed to the simulated microservice comprises causing the request to be routed to the simulated microservice based on the routing address.

In some embodiments, the method 1000 further comprises in response to determining that the execution of the second microservice is available, causing the request to be routed to the second microservice.

It should be noted that the processing of availability level-based service management according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    detecting, by one or more processors, initiation of a request from a first microservice to a second microservice, the first and second microservices being comprised in a plurality of microservices of an application, and the request comprising an expected availability level for the application;
    determining, by the one or more processors, a current availability level of the application based on at least status information of an environment where at least one of the plurality of microservices are deployed;
    in response to the current availability level of the application being higher than or equal to the expected availability level, determining, by one or more processors, whether an execution of the second microservice is available;
    in response to determining that the execution of the second microservice is unavailable, causing, by one or more processors, the request to be routed to a simulated microservice of the second microservice, the simulated microservice configured to return to the first microservice a dummy response to the request; and in response to determining that the execution of the second microservice is unavailable, determining, by one or more processors, whether the second microservice satisfies a predetermined condition for microservice simulation, wherein the predetermined condition is a determination that importance of the second microservice for the application is lower than a predetermined importance threshold.

2. The method of claim 1, wherein the determining the current availability level of the application is further based on at least one of the following:
a respective operational status of at least one of the plurality of microservices,
a respective response time of at least one of the plurality of microservices,
a Quality of Service (QoS) of the application,
a Service Level Agreement (SLA) of the application, and/or
a Service Level Objective (SLO) of the application.

3. The method of claim 1, wherein determining whether the execution of the second microservice is available comprises:
determining, by one or more processors, whether the second microservice is failed; and
in response to determining that the second microservice is failed, determining, by one or more processors, that the execution of the second microservice is unavailable.

4. The method of claim 1, wherein determining whether the execution of the second microservice is available comprises:
determining, by one or more processors, whether a response time of the second microservice exceeds a threshold time length; and
in response to determining that the response time exceeds the threshold time length, determining, by one or more processors, that the execution of the second microservice is unavailable.

5. The method of claim 1, further comprising:
in response to determining that the second microservice satisfies the predetermined condition, deploying, by one or more processors, the simulated microservice for the second microservice.

6. The method of claim 5, wherein determining whether the second microservice satisfies the predetermined condition comprises:
determining, by one or more processors, that the second microservice satisfies the predetermined condition further based on at least one of the following:
a determination that the request is initiated to the second microservice,
a user indication of allowance of microservice simulation for the second microservice.

7. The method of claim 5, further comprising:
maintaining, by one or more processors, configuration information related to the simulated microservice, the configuration information comprising at least one of the following: the dummy response, an access protocol, a request method, and a predefined code of the simulated microservice; and
wherein deploying the simulated microservice comprises:
deploying, by one or more processors, the simulated microservice based on the configuration information.

8. The method of claim 5, further comprising:
in response to determining that the simulated microservice is deployed for the second microservice, maintaining, by one or more processors, a routing address of the simulated microservice; and wherein causing the request to be routed to the simulated microservice comprises:
causing, by one or more processors, the request to be routed to the simulated microservice based on the routing address.

9. A system comprising:
a processing unit; and
a memory coupled to the processing unit and storing instructions thereon, the instructions, when executed by the processing unit, performing acts including:
detecting initiation of a request from a first microservice to a second microservice, the first and second microservices being comprised in a plurality of microservices of an application, and the request comprising an expected availability level for the application;
determining a current availability level of the application based on at least a Service Level Agreement (SLA) of the application;
in response to the current availability level of the application being higher than or equal to the expected availability level, determining whether execution of the second microservice is available;
in response to determining that the execution of the second microservice is unavailable, causing the request to be routed to a simulated microservice of the second microservice, the simulated microservice configured to return to the first microservice a dummy response to the request; and
in response to determining that the execution of the second microservice is unavailable, determining whether the second microservice satisfies a predetermined condition for microservice simulation, wherein the predetermined condition is a determination that importance of the second microservice for the application is lower than a predetermined importance threshold.

10. The system of claim 9, wherein the acts further include:
determining the current availability level of the application based on at least one of the following:
a respective operational status of at least one of the plurality of microservices,
a respective response time of at least one of the plurality of microservices,
status information of an environment where at least one of the plurality of microservices are deployed,
a Quality of Service (QoS) of the application, and/or
a Service Level Objective (SLO) of the application.

11. The system of claim 9, wherein determining whether the execution of the second microservice is available comprises:
determining whether the second microservice is failed; and
in response to determining that the second microservice is failed, determining that the execution of the second microservice is unavailable.

12. The system of claim 9, wherein determining whether the execution of the second microservice is available comprises:
determining whether a response time of the second microservice exceeds a threshold time length; and
in response to determining that the response time exceeds the threshold time length, determining that the execution of the second microservice is unavailable.

13. The system of claim 9, wherein the acts further include:

in response to determining that the second microservice satisfies the predetermined condition, deploying the simulated microservice for the second microservice.

14. The system of claim 13, wherein determining whether the second microservice satisfies the predetermined condition comprises:
determining that the second microservice satisfies the predetermined condition further based on at least one of the following:
a determination that the request is initiated to the second microservice, and
a user indication of allowance of microservice simulation for the second microservice.

15. The system of claim 13, wherein the acts further include:
maintaining configuration information related to the simulated microservice, the configuration information comprising at least one of the following: the dummy response, an access protocol, a request system, and a predefined code of the simulated microservice; and
wherein deploying the simulated microservice comprises:
deploying the simulated microservice based on the configuration information.

16. The system of claim 13, wherein the acts further include:
in response to determining that the simulated microservice is deployed for the second microservice, maintaining a routing address of the simulated microservice; and
wherein causing the request to be routed to the simulated microservice comprises:
causing the request to be routed to the simulated microservice based on the routing address.

17. The system of claim 9, wherein the acts further include:
in response to subsequently determining that the execution of the second microservice is available, causing the request to be routed to the second microservice.

18. A computer program product being tangibly stored on a non-transient machine-readable medium and comprising machine-executable instructions, the instructions, when executed on a device, causing the device to perform acts including:
detecting initiation of a request from a first microservice to a second microservice, the first and second microservices being comprised in a plurality of microservices of an application, and the request comprising an expected availability level for the application;
determining a current availability level of the application based on at least a Service Level Objective (SLO) of the application;
in response to the current availability level of the application being higher than or equal to the expected availability level, determining whether execution of the second microservice is available;
in response to determining that the execution of the second microservice is unavailable, causing the request to be routed to a simulated microservice of the second microservice, the simulated microservice configured to return to the first microservice a dummy response to the request; and
in response to determining that the execution of the second microservice is unavailable, determining, by one or more processors, whether the second microservice satisfies a predetermined condition for microservice simulation, wherein the predetermined condition is a determination that importance of the second microservice for the application is lower than a predetermined importance threshold.

19. The computer program product of claim 18, wherein the acts further include:
in response to determining that the second microservice satisfies the predetermined condition, deploying the simulated microservice for the second microservice.

20. The method of claim 1, further comprising:
in response to determining that the execution of the second microservice is available, causing, by one or more processors, the request to be routed to the second microservice.

* * * * *